United States Patent
Kirchner et al.

(10) Patent No.: US 11,995,228 B2
(45) Date of Patent: May 28, 2024

(54) HEAD TRACKING SYSTEM WITH EXTENDED KALMAN FILTER COMBINING ABSOLUTE AND RELATIVE NAVIGATION

(71) Applicant: Rockwell Collins, Inc., Cedar Rapids, IA (US)

(72) Inventors: William T. Kirchner, Ashburn, VA (US); Gavin P. Haentjens, Arlington, VA (US); Christopher M. Boggs, Gainesville, VA (US); Brandon E. Wilson, Portland, OR (US); Troy D. Driscoll, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/895,751

(22) Filed: Aug. 25, 2022

(65) Prior Publication Data
US 2023/0221795 A1 Jul. 13, 2023

Related U.S. Application Data

(63) Continuation-in-part of application No. 17/685,032, filed on Mar. 2, 2022, which is a continuation-in-part of application No. 17/573,283, filed on Jan. 11, 2022.

(51) Int. Cl.
*G06F 3/01* (2006.01)
*G06F 3/0346* (2013.01)
(Continued)

(52) U.S. Cl.
CPC ............ *G06F 3/012* (2013.01); *G06F 3/0346* (2013.01); *G06T 7/20* (2013.01); *G06T 7/70* (2017.01);
(Continued)

(58) Field of Classification Search
CPC ........ G06F 3/011; G06F 3/012; G06F 3/0325; G06F 3/0346; G06T 7/70; G06T 7/97;
(Continued)

(56) References Cited

U.S. PATENT DOCUMENTS 5,645,077 A   7/1997   Foxlin
5,812,257 A   9/1998   Teitel et al.
(Continued)

FOREIGN PATENT DOCUMENTS

CA   3058955 C   5/2022
EP   1203285 A1   5/2002
(Continued)

OTHER PUBLICATIONS

Chatterji, G.B. et al: "GPS/machine vision navigation system for aircraft", IEEE Transactions on Aerospace and Electronic Systems, IEEE Service Center, Piscataway, NJ, US, vol. 33, No. 3, Jul. 1, 1997, pp. 1012-1025.
(Continued)

*Primary Examiner* — Ke Xiao
*Assistant Examiner* — Nelson Lam
(74) *Attorney, Agent, or Firm* — Suiter Swantz IP

(57) ABSTRACT

A system and method for head tracking for a head worn display (HWD) includes head-frame and platform-frame IMUs providing high-rate pose data of the wearer's head and a mobile platform. An optical tracker estimates an optical pose of a camera oriented at fiducials based on a comparison of 2D image data captured by the camera (and portraying the fiducials within the image) and the known location of each fiducial in a 3D marker frame. The pIMU also provides low-rate, high-integrity georeferenced pose data of the mobile platform (e.g., in an earth frame). The head tracker provides low-rate, high-integrity absolute head pose solutions (e.g., user head pose in the earth frame) based on the
(Continued)

georeferenced pose data and current high-rate head/platform pose data, updating the absolute pose solutions with high-rate updates based on combined extended Kalman filter propagation of the high-rate head and platform pose data with refined optical pose data.

16 Claims, 11 Drawing Sheets

(51) Int. Cl.
*G06T 7/20* (2017.01)
*G06T 7/70* (2017.01)

(52) U.S. Cl.
CPC .............. *G06T 2207/30201* (2013.01); *G06T 2207/30208* (2013.01)

(58) Field of Classification Search
CPC . G06T 2207/30196; G06T 2207/30201; G06T 2207/30204; G06T 2207/30208
USPC .......................................................... 345/7–9
See application file for complete search history.

(56) References Cited

U.S. PATENT DOCUMENTS

| | | | |
|---|---|---|---|
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |
| 6,408,245 B1 | 6/2002 | An et al. | |
| 6,409,687 B1 | 6/2002 | Foxlin | |
| 6,449,559 B2 | 9/2002 | Lin | |
| 6,474,159 B1 | 11/2002 | Foxlin et al. | |
| 6,480,152 B2 | 11/2002 | Lin et al. | |
| 6,658,354 B2 | 12/2003 | Lin | |
| 6,681,629 B2 | 1/2004 | Foxlin et al. | |
| 6,738,714 B2 | 5/2004 | McCall et al. | |
| 6,786,877 B2 | 9/2004 | Foxlin | |
| 6,820,025 B2 | 11/2004 | Bachmann et al. | |
| 7,000,469 B2 | 2/2006 | Foxlin et al. | |
| 7,046,215 B1 | 5/2006 | Bartlett | |
| 7,266,446 B1 | 9/2007 | Pelosi | |
| 7,301,648 B2 | 11/2007 | Foxlin | |
| 7,395,181 B2 | 7/2008 | Foxlin | |
| 7,409,290 B2 | 8/2008 | Lin | |
| 7,640,106 B1 | 12/2009 | Stokar et al. | |
| 7,672,781 B2 | 3/2010 | Churchill et al. | |
| 8,019,538 B2 | 9/2011 | Soehren et al. | |
| 8,165,844 B2 | 4/2012 | Luinge et al. | |
| 8,953,154 B2 | 2/2015 | Galea et al. | |
| 8,965,736 B2 | 2/2015 | Horton et al. | |
| 9,031,809 B1 | 5/2015 | Kumar et al. | |
| 9,478,141 B2 | 10/2016 | Revell et al. | |
| 9,569,668 B2 | 2/2017 | Schertler | |
| 9,779,550 B2 | 10/2017 | Tobita | |
| 9,891,705 B1* | 2/2018 | Lahr ........................ F41G 3/225 | |
| 10,216,265 B1* | 2/2019 | Kirchner .................... G06T 7/70 | |
| 10,597,168 B2 | 3/2020 | Boada-Bauxell et al. | |
| 10,664,989 B1 | 5/2020 | Goslin et al. | |
| 10,775,881 B1 | 9/2020 | Lahr et al. | |
| 10,909,715 B1* | 2/2021 | Boggs ................. G02B 27/0093 | |
| 11,036,453 B1* | 6/2021 | Jarrett ................... G02B 27/017 | |
| 11,055,875 B2 | 7/2021 | Cramblitt | |
| 17,573,283 | 1/2022 | Boggs et al. | |
| 11,320,650 B1* | 5/2022 | Tiana .................. G02B 27/0101 | |
| 11,354,815 B2 | 6/2022 | Suzuki et al. | |
| 11,354,868 B1 | 6/2022 | Judd et al. | |
| 11,360,552 B1* | 6/2022 | Tiana .................... G06V 40/166 | |
| 11,365,974 B2 | 6/2022 | Mendez et al. | |
| 11,880,034 B2* | 1/2024 | Tiana ...................... G02B 27/34 | |
| 11,914,763 B1* | 2/2024 | Boggs ...................... G06T 19/20 | |
| 2004/0149036 A1 | 8/2004 | Foxlin et al. | |
| 2008/0285805 A1* | 11/2008 | Luinge .................... G06F 3/011 | |
| | | | 382/128 |
| 2010/0039294 A1 | 2/2010 | Feyereisen et al. | |
| 2010/0045701 A1 | 2/2010 | Scott et al. | |
| 2013/0234850 A1 | 9/2013 | Lee et al. | |
| 2013/0237811 A1 | 9/2013 | Mihailescu et al. | |
| 2014/0212000 A1 | 7/2014 | Yagcioglu et al. | |
| 2015/0317838 A1 | 11/2015 | Foxlin | |
| 2015/0332153 A1 | 11/2015 | Bourdis et al. | |
| 2016/0148045 A1 | 5/2016 | Bicer et al. | |
| 2017/0358131 A1 | 12/2017 | Weiss et al. | |
| 2019/0041979 A1 | 2/2019 | Kirchner et al. | |
| 2019/0196198 A1 | 6/2019 | Aymeric et al. | |
| 2020/0005448 A1 | 1/2020 | Subramanian et al. | |
| 2021/0319709 A1 | 10/2021 | Rose et al. | |
| 2022/0050290 A1* | 2/2022 | Fortin-Deschênes ........................ G06T 19/006 | |
| 2023/0100979 A1* | 3/2023 | Wan .................... G02B 27/0179 | |
| | | | 345/8 |
| 2023/0110716 A1* | 4/2023 | Fletcher ............. G02B 27/0172 | |
| | | | 345/8 |
| 2023/0222689 A1* | 7/2023 | Boggs .................... G06V 40/10 | |
| | | | 382/103 |

FOREIGN PATENT DOCUMENTS

| | | |
|---|---|---|
| EP | 1157326 B1 | 10/2002 |
| EP | 2201532 B1 | 2/2012 |
| EP | 3690734 A1 | 8/2020 |
| EP | 3668792 A4 | 8/2021 |
| EP | 3864491 A1 | 8/2021 |
| WO | 2017042578 A1 | 3/2017 |

OTHER PUBLICATIONS

Extended European Search Report dated Jun. 16, 2023; European Application No. 23150030.7.
Pieniazek, Jacek: "Measurement of aircraft approach using airfield image", Measurement, vol. 141, Jul. 1, 2019, pp. 396-406.
Tonhuser, Christian et al: "Integrity Concept for Image-Based Automated Landing Systems", PNT 2015—Proceedings of the ION 2015 Pacific PNT Meeting, The Institute of Navigation, 8551 Rixlew Lane, Suite 360, Manassas, VA 20109, USA, Apr. 23, 2015, pp. 733-747.
Calhoun, Sean M. et al: "Integrity determination for a vision based precision relative navigation system", 2016 IEEE/ION Position, Location and Navigation Symposium (Plans), IEEE, Apr. 11, 2016, pp. 294-304.
Extended European Search Report dated Jun. 22, 2023; European Application No. 23150358.2.
Frisch Gabriel et al.: "High Integrity Lane Level Localization Using Multiple Lane Markings Detection and Horizontal Protection Levels", 2018 15th International Conference on Control, Automation, Robotics and Vision (ICARCV), IEEE, Nov. 18, 2018, pp. 1496-1501.
Hecker P. et al: "Optical Aircraft Positioning for Monitoring of the Integrated Navigation System during Landing Approach", Gyroscopy and Navigation, Pleiades Publishing, Moscow, vol. 10, No. 4, Oct. 1, 2019, pp. 216-230.
Alcantara, et al., (2011). Alternative Position, Orientation and Data Recognition Algorithms for Augmented Reality Markers. Retrieved at https://www.researchgate.net/publication/267246987_ALTERNATIVE_POSITION_ORIENTATION_AND_DATA_RECOGNITION_ALGORITHMS_FOR_AUGMENTED_REALITY_MARKERS.
Cai, Xingcheng. A Prototype Helmet Fitting System for Concussion Protection. Diss. M. Sc. thesis, School of Computing, Queen's University, Kingston, Ontario, Canada, 2015. (Year:2015).
Extended Search Report in European Application No. 181870114 dated Jan. 7, 2019, 10 pages.
Ferrin F J: "Survey of Helmet Tracking Technologies", Visual Communications and Image Processing; Jan. 20, 2004-Jan. 20, 2004; San Jose, vol. 1456, Feb. 26, 1991 (Feb. 26, 1991), pp. 86-94, XP000578495, DOI: 10.1117/12.45422, ISBN: 978-1-62841-730-2.

(56) References Cited

OTHER PUBLICATIONS

Extended European Search Report dated May 10, 2023; European Application No. 23151205.4.
Extended European Search Report dated May 12, 2023; European Application No. 23150052.1.

* cited by examiner $$x = [\delta r_{h/b}^b \ \delta v_{h/b}^b \ \delta a_{b,h} \ \phi^b \ \delta \omega_{b,h} \ \delta b \ \delta \theta \ \delta h \ \delta v_n^1 \ \psi \ \delta a_{b,b} \ \delta \omega_{b,b}]^T$$

$$\dot{x} = Jx + Gw$$

FIG. 2B

$$\begin{bmatrix} I_3 & 0 & 0 & 0 & 0 & 0 & 0 & 0 & 0 & 0 & 0 & 0 \\ 0 & -C_h^b & 0 & 0 & 0 & 0 & 0 & 0 & 0 & 0 & 0 & -R_{h/b}^b \\ 0 & I_3 & 0 & 0 & 0 & 0 & 0 & 0 & 0 & 0 & 0 & 0 \\ 0 & 0 & C_h^b & 0 & 0 & 0 & 0 & 0 & -(2V_{h/b}^b + \Omega_{b/i}^b R_{h/b}^b) & 0 & 0 & 0 \\ 0 & 0 & 0 & I_3 & 0 & 0 & 0 & 0 & 0 & 0 & 0 & 0 \\ 0 & 0 & 0 & 0 & I_3 & 0 & 0 & 0 & 0 & 0 & 0 & 0 \\ 0 & 0 & 0 & 0 & 0 & I_3 & 0 & 0 & -I_3 & 0 & 0 & 0 \\ 0 & 0 & 0 & 0 & 0 & 0 & I_3 & 0 & 0 & 0 & 0 & 0 \\ 0 & 0 & 0 & 0 & 0 & 0 & 0 & I_3 & 0 & 0 & 0 & 0 \\ 0 & 0 & 0 & 0 & 0 & 0 & 0 & 0 & I_3 & 0 & 0 & 0 \\ 0 & 0 & 0 & 0 & 0 & 0 & 0 & 0 & 0 & 0 & I_3 & 0 \\ 0 & 0 & 0 & 0 & 0 & 0 & 0 & 0 & 0 & 0 & 0 & I_3 \end{bmatrix}$$

$$[\eta v_{h/b} \ \eta a_h \ \eta a_{b,h} \ \eta\omega_h \ \eta\omega_{b,h} \ \eta b \ \eta v_n^1 \ \eta a_b \ \eta a_{b,b} \ \eta\omega_b \ \eta\omega_{b,b} \ \eta\alpha_b]^T$$

724 — Forwarding to a display unit of the HWD, via the controller, one or more of:
- the output head pose solution and the output error bound
- the update head pose solution and the update error bound

726 — Determining an initial optical pose associated with a current time of validity based on a refined optical pose associated with a prior time of validity

*FIG. 7D*

HEAD TRACKING SYSTEM WITH EXTENDED KALMAN FILTER COMBINING ABSOLUTE AND RELATIVE NAVIGATION

CROSS-REFERENCE TO RELATED APPLICATIONS

The instant application relates to and incorporates by reference in their entirety the following patent applications, domestic and foreign:

U.S. patent application Ser. No. 16/263,388 filed Jan. 31, 2019 and entitled HIGH-INTEGRITY OPTICAL POSE ESTIMATION USING CODED FEATURES, which application issued Feb. 1, 2021 as U.S. Pat. No. 10,909,715;

U.S. patent application Ser. No. 15/670,934 filed Aug. 7, 2017 and entitled SYSTEM AND METHOD FOR HYBRID OPTICAL/INERTIAL HEADTRACKING VIA NUMERICALLY STABLE KALMAN FILTER, which application issued Feb. 26, 2019 U.S. Pat. No. 10,216,265;

U.S. patent application Ser. No. 17/573,283 filed Jan. 11, 2022 and entitled VISION-BASED NAVIGATION SYSTEM INCORPORATING MODEL-BASED CORRESPONDENCE DETERMINATION WITH HIGH-CONFIDENCE AMBIGUITY IDENTIFICATION;

U.S. patent application Ser. No. 17/685,032 filed Mar. 2, 2022 and entitled VISION-BASED NAVIGATION SYSTEM INCORPORATING HIGH-CONFIDENCE ERROR OVERBOUNDING OF MULTIPLE OPTICAL POSES;

and concurrently filed U.S. patent application Ser. No. 17/895,853 entitled HIGH-CONFIDENCE OPTICAL HEAD POSE CORRESPONDENCE MAPPING WITH MULTIPLE LOWER-DENSITY MARKERS FOR HIGH-INTEGRITY HEADTRACKING ON A HEADWORN DISPLAY (HWD).

BACKGROUND

For a head-worn display unit (HWD; also, head-mounted or helmet-mounted display) to accurately display aircraft or georeferenced symbology and imagery, the HWD must have accurate head pose data: the position and orientation of the head (e.g., upon which the HWD is worn, and with which the HWD itself moves) relative to a platform reference frame. For example, an aircraft (or ground-based vehicle, or other like mobile platform) may move relative to a georeferenced frame (e.g., WGS 84, PZ-90, or other frames) while the head of the aircraft's pilot may move relative to the aircraft reference frame.

Head pose may be estimated by inertial measurement units (IMU) configured to detect and report accelerations, angular rates, or changes in velocity and orientation over time. For example, a first IMU may be rigidly mounted to (and may estimate and track the relative position and orientation of) the aircraft, and a second IMU (independent of the first IMU) may be rigidly mounted to (and may estimate and track the relative position and orientation of) the head/HWD. To arrive at an accurate head pose estimate by differencing these two IMUs (relative navigation) requires a means of correcting, or compensating for, uncertainties or errors associated with either IMU. Aiding devices may provide position and orientation (pose) measurements in six degrees of freedom (6DOF), which serve as a means of correcting, or compensating for, the inherent drift of both IMUs, solving the relative navigation problem and differencing the first and second IMUs, achieving accurate head pose estimates relative to the platform reference frame.

Ultimately, however, a relative navigation filter is of limited use by itself when the ultimate goal is to display to the wearer or user of an HWD symbology referenced in an earth-centered earth-fixed (ECEF) frame, and furthermore to do so with sufficiently high integrity and sufficiently low latency as to reflect changes in the relationship of the head and platform frames to the ECEF frame in real time (or sufficiently near real time that the displayed symbology does not include hazardously misleading information (HMI).

SUMMARY

In a first aspect, a head tracking system for a head worn display (HWD) is disclosed. In embodiments, the head tracking system includes a platform-referenced (platform frame) inertial measurement unit (IMU) (pIMU) fixed to an aircraft or other mobile platform, the pIMU providing a high-rate platform-referenced position and orientation of the mobile platform (pose data) in the platform frame. The head tracking system includes a head-referenced (head frame) IMU (hIMU) fixed to the head of the HWD user (e.g., wearer of the HWD) and providing high-rate head pose data in the head frame. An optical tracker includes a camera attached to the head or to the platform stores constellation data including positions and orientations of each of a set of fiducial markers (likewise attached to the head or to the platform, to whichever the camera is not attached) in a three-dimensional (3D) marker frame. The camera captures two-dimensional (2D) image data of the environment in which the fiducial markers are attached, which the optical tracker analyzes to identify the fiducial markers at relative locations (e.g., pixel locations) within the image data. By comparing the relative 2D locations of identified markers with their known 3D positions and orientations, the optical tracker estimates an optical pose of the camera relative to the 3D marker frame. The initial optical pose may be refined (e.g., via reprojection of the 2D image data into the 3D constellation data, via detection of additional markers based on the initial head pose estimate) and includes an error bound bounding the accuracy and integrity of the refined optical pose. In embodiments, the pIMU provides low-rate georeferenced pose data of the mobile platform in an earth-centered earth-referenced (ECEF) frame (earth frame). Based on the low-rate georeferenced pose data and the high-rate head-frame and platform-frame pose data, the head tracker system determines a low-rate, high-integrity output head pose solution (e.g., of the user's head) and a high-confidence error bound in the ECEF frame. Between low-rate georeferenced pose data updates, the head tracker provides high-rate updates to the output head pose and error bound in the ECEF frame via combined extended Kalman filter propagation of the most recent output head pose with the high-rate head-frame and platform-frame pose data and the refined optical pose.

In some embodiments, the head tracker forwards the output head pose solution or update head pose solution, along with the corresponding error bound, to the HWD for use by any display-related applications compatible with the integrity and/or accuracy of the head pose data.

In some embodiments, the update head pose solution includes a tightly coupled head pose update based on a prior high-integrity head pose solution and one or more fiducial markers detected at the current time of validity.

In some embodiments, the update head pose solution includes a loosely coupled head pose update based on a prior high-integrity head pose solution and corresponding pose covariance.

In some embodiments, an initial optical pose estimate at a current time of validity is based on a refined optical pose at a prior time of validity.

In some embodiments, the head tracking system is an inside-out system wherein the camera is attached to the HWD or to the head of the user, and the fiducial markers are disposed within the mobile platform in the field of view of the camera.

In some embodiments, the head-tracking system is an outside-in system wherein the camera is disposed within the mobile platform and oriented at the user, and the fiducial markers are disposed on the helmet or user's head at known positions and orientations.

In some embodiments, the optical tracker determines an error bound for an optical pose estimate by reprojecting the 2D image data into the corresponding 3D constellation data and determining a pose covariance, fault status, and corresponding protection level of the optical pose estimate.

In some embodiments, the 3D constellation data includes, for each constellation of fiducial markers, a position and orientation of each marker in the marker frame as well as a marker geometry defining the position and orientation of each fiducial marker relative to each other fiducial marker. For example, the optical tracker may base an optical pose estimate on a full or partial detection of a constellation of fiducial markers, or refine an initial pose estimate based on detected fiducial markers by determining where undetected fiducial markers should be within the image data.

In a further aspect, a method for determining an absolute head pose is also disclosed. In embodiments, the method includes providing high-rate (e.g., 200 Hz) platform-frame pose data (e.g., of a mobile platform) via a platform-frame IMU (pIMU). The method includes providing high-rate head-frame pose data (e.g., of a head of the wearer of the HWD) via a head-frame IMU (hIMU). The method includes providing constellation data including unique encoded identifiers and 3D position data (e.g., in a common marker frame) of a set of fiducial markers disposed throughout the mobile platform cockpit in view of a camera of the HWD. The method includes capturing 2D image data via the camera including one or more of the fiducial markers in view. The method includes identifying, via an optical tracker, one or more fiducial markers within the image data at relative pixel locations. The method includes comparing the relative 2D pixel locations and known 3D locations of detected fiducial markers to estimate an optical pose of the camera relative to the 3D marker frame. The method includes refining the optical pose via the optical tracker. The method includes determining a high-confidence error bound for the refined optical pose. The method includes providing, via the pIMU, low-rate (e.g., 20 Hz), high-integrity georeferenced pose data of the mobile platform. The method includes determining low-rate high-integrity absolute head pose solutions, e.g., a head pose of the wearer in the earth frame, and high confidence error bounds for the absolute head pose solutions, based on the high-integrity georeferenced pose data and the low-rate head-frame and platform-frame pose data. The method includes updating the low-rate absolute head pose solutions with high-rate head pose updates based on hybrid extended Kalman filter propagation of the most recent absolute head pose solutions based on the high-rate head-frame and platform-frame pose data and the refined optical pose.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 2B and 2C illustrate error state dynamics for the hybrid EKF of FIG. 2A;

and FIGS. 7A through 7D are flow diagrams illustrating a method for determining an absolute head pose according to with example embodiments of this disclosure.

DETAILED DESCRIPTION

Figure 1:
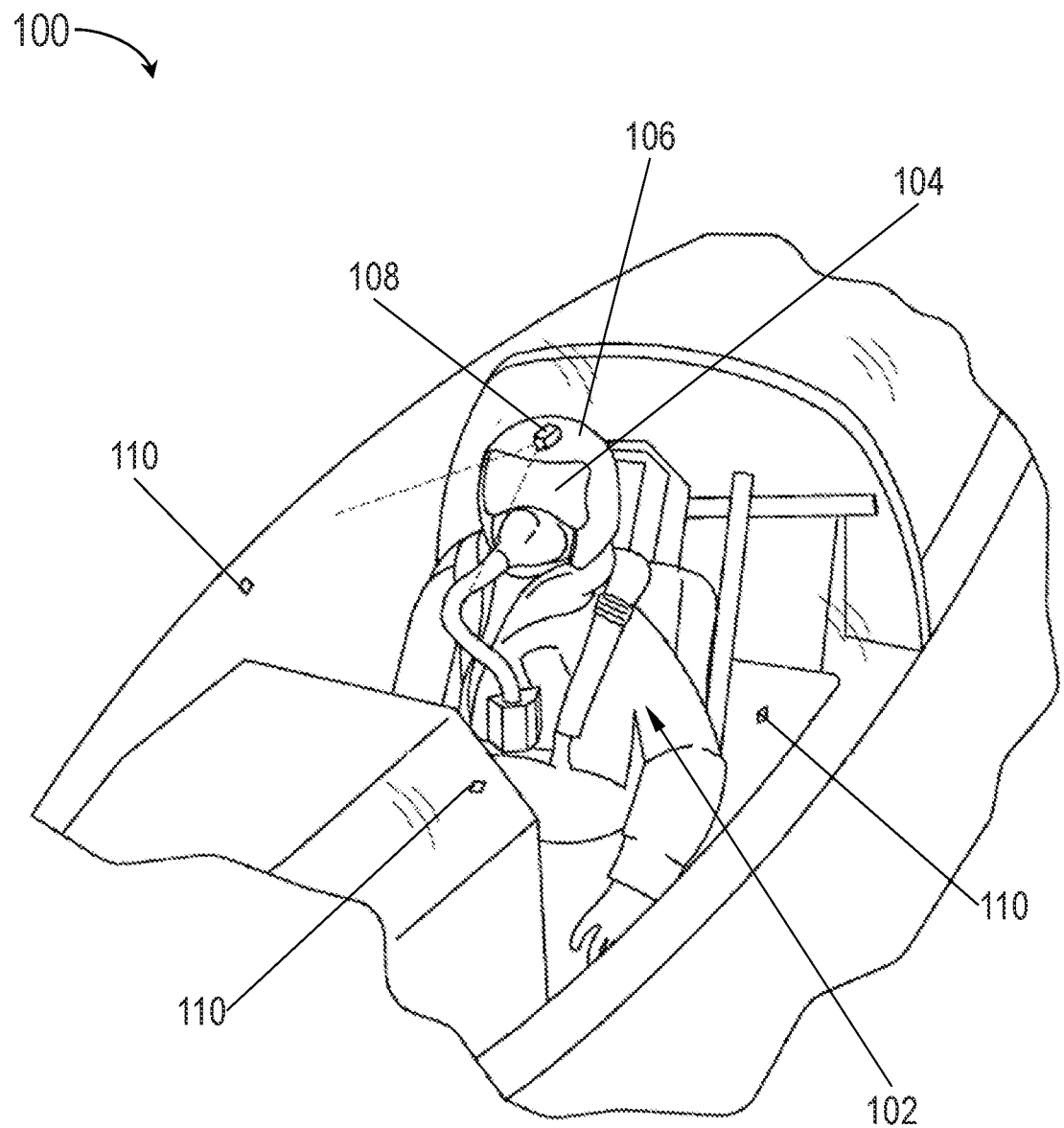
FIG. 1 is an illustration of an aircraft cockpit environment and a head worn display (HWD) worn by a pilot of the aircraft, the HWD including a head tracking system in an inside-out configuration according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, an aircraft 100 is shown.

In embodiments, the aircraft 100 may be controlled by a pilot or other user 102 wearing a head worn display 104 (HWD; e.g., helmet-mounted display (HMD)). For example, the HWD 104 may include a display unit proper, e.g., integrated into a helmet 106 or visor worn by the user 102, and a head tracker system incorporating components fixed or otherwise attached to the helmet and within the cockpit or control area of the aircraft.

In embodiments, the head tracker system may include an optical tracker at least partially integrated into the helmet 106. For example, the optical tracker may include one or more cameras 108 or other like image sensors attached to the helmet 106 and configured to capture a continuous stream of image data corresponding to whatever the user 102 is looking at, or seeing, at any particular moment. The camera 108 may be fixed to the helmet 106, e.g., in a strapdown configuration, wherein the camera moves in unison with the helmet, and with the head of the user 102, and is said to be in a head-centered reference frame ("head frame"). Alternatively, the camera 108 may be attached to the helmet 106 via one or more gimbals (not shown) capable of translating or rotating the camera relative to the helmet. In embodiments, the camera/s 108 may be tuned to operate in a variety of spectral bands, e.g., visible-range, near-infrared (NIR), short wave infrared (SWIR), long wave IR (LWIR).

In embodiments, when the camera 108 is in the strapdown configuration, the position and orientation ("pose") of the camera may be equivalent to the pose of the head of the user 102, or in a fixed relationship (e.g., constant rotation and/or translation) relative to the head pose. For example, when the user 102 moves their head (e.g., translates, rotates), the head tracker includes head-frame inertial measurement units (IMU, hIMU) integrated into the helmet 106 and capable of tracking each translation and rotation of the head in the head frame, e.g., relative to a reference pose (for example, when the user's head is oriented straight ahead at eye level).

In embodiments, the head tracker may estimate the head pose of the user 102 by detecting and decoding fiducial markers 110 within the cockpit environment. For example, each fiducial marker 110 may be fixed within the cockpit environment at a position and orientation (e.g., relative to the aircraft 100) known to the head tracker. Further, each fiducial marker 110 may include an encoded identifier (ID) decodable by the head tracker and uniquely distinguishing each fiducial marker, e.g., within a set of such markers disposed throughout the cockpit environment. For example, ArUco markers (e.g., named after the University of Cordoba where they were first developed) or other binary square fiducial markers may include an N-square binary pattern (where N is an integer, e.g., a 4×4 or 16-square pattern of black and white squares) corresponding to an N-bit binary identifier.

In embodiments, by identifying image regions corresponding to each fiducial marker 110 from within image data captured by the camera 108, the head tracker may compare the relative positions and/or orientations of each detected fiducial marker with their known positions and orientations and thereby estimate the position and orientation of the camera (and thus the head of the user 102) at the time the image was captured.

In embodiments, the aircraft 100 may determine its position and orientation in both an absolute and a relative sense. For example, the aircraft 100 may include an absolute positioning system, e.g., one or more global navigation satellite system (GNSS) based receivers configured to receive positioning signals from orbiting navigational satellites (e.g., GPS, GLONASS, Galileo, BeiDou, NavIC, QZSS). Based on the arrival times of signals received from multiple satellites, the GNSS based receivers can determine the aircraft's distance from each satellite at the time of reception and thereby determine an absolute position of the aircraft in an earth-centered, earth-fixed (ECEF) reference frame ("earth frame") to a high degree of precision. Similarly, the aircraft 100 may include IMUs capable of determining a relative position and orientation of the aircraft in an aircraft-centered reference frame (e.g., platform frame, body frame) relative to a reference pose of the aircraft. For example, if the aircraft 100 enters an airspace where GNSS services are unavailable or unreliable, the platform-frame IMUs (pIMU) may track the relative position of the aircraft relative to a last known absolute position as determined by the GNSS receivers, as well as the orientation of the aircraft relative to its pitch, roll, and yaw axes (e.g., x-, y-, and z-axes).

Any IMU, regardless of its reference frame, is subject to some degree of inherent drift and/or internal noise. For example, as noted above a pIMU may track a relative position and orientation of the aircraft 100 relative to its last known absolute position and orientation, but as the elapsed time increases from this last known pose, so too will the level of inherent drift. Aiding devices may provide a means for correcting and compensating for inherent drift in inertial navigation systems. For example, U.S. Pat. No. 10,216,265, which is incorporated by reference herein in its entirety, discloses a numerically stable extended Kalman filter for relative navigation, or estimating a pose of a user's (102; e.g., pilot) head (e.g., as measured by the hIMU in the head frame) relative to the pose of an aircraft 100 (e.g., as measured by the pIMU in the platform frame) carrying the user. Optical or magnetic aiding devices may provide estimated head pose measurements ("pose estimates") in six degrees of freedom (6DoF), e.g., translation along x-, y-, and z-axes (pitch, roll, yaw) and rotation relative to these axes. 6DoF pose estimates provided by the aiding devices may correct for drift and noise in a relative navigational solution estimating the pose of the pilot's head relative to the aircraft in order to display flight guidance cues on the HWD 104 display unit. Further, the relative navigation solution may include an error model estimating the probability of displaying hazardously misleading information (HMI) and bounding the accuracy of the head pose estimate by attempting to estimate and/or account for drift, noise, and other uncertainties within the navigational system. For example, system integrity requirements generally mandate this probability be no more than $1e^{-5}$ to $1\ e^{-7}$ (0.00001 to 0.001 percent) per hour, or a pose error more than 0.5 to 4 inches in position and 3 to 20 milliradians (mrad) in orientation.

In embodiments, the head tracker of the HWD 104 may provide improved accuracy and reduced latency by combining a relative navigation (RelNav) filter (e.g., which determines a transformation in 6DoF between the platform and head frames) with extended Kalman filtering for absolute navigation, i.e., an absolute head pose in an ECEF frame. A conventional federated solution (e.g., RelNav filter for head frame-to-platform frame, transfer alignment filter for platform frame-to-earth frame) may include, for example, an embedded GPS/inertial navigation system (EGI) configured to estimate latitude, longitude, altitude, roll, pitch, heading; however, these estimates may be filtered separately from relative navigation solutions as described above. In embodiments, the head tracker of the HWD 104 may provide high-rate, bias-corrected, angular rates and accelerations in the platform frame to the extended Kalman filter, aligning the relative navigation solution to georeferenced EGI pose data. For example, the hybrid extended Kalman filter may combine in a single filter both head-to-platform RelNav filtering with platform absolute navigation filtering, based in part on common error states between the platform RelNav and platform absolute filters, and thereby may provide an absolute earth-frame head pose solution enabling the HWD 104 to display symbology referenced in the ECEF frame.

Figure 2A:
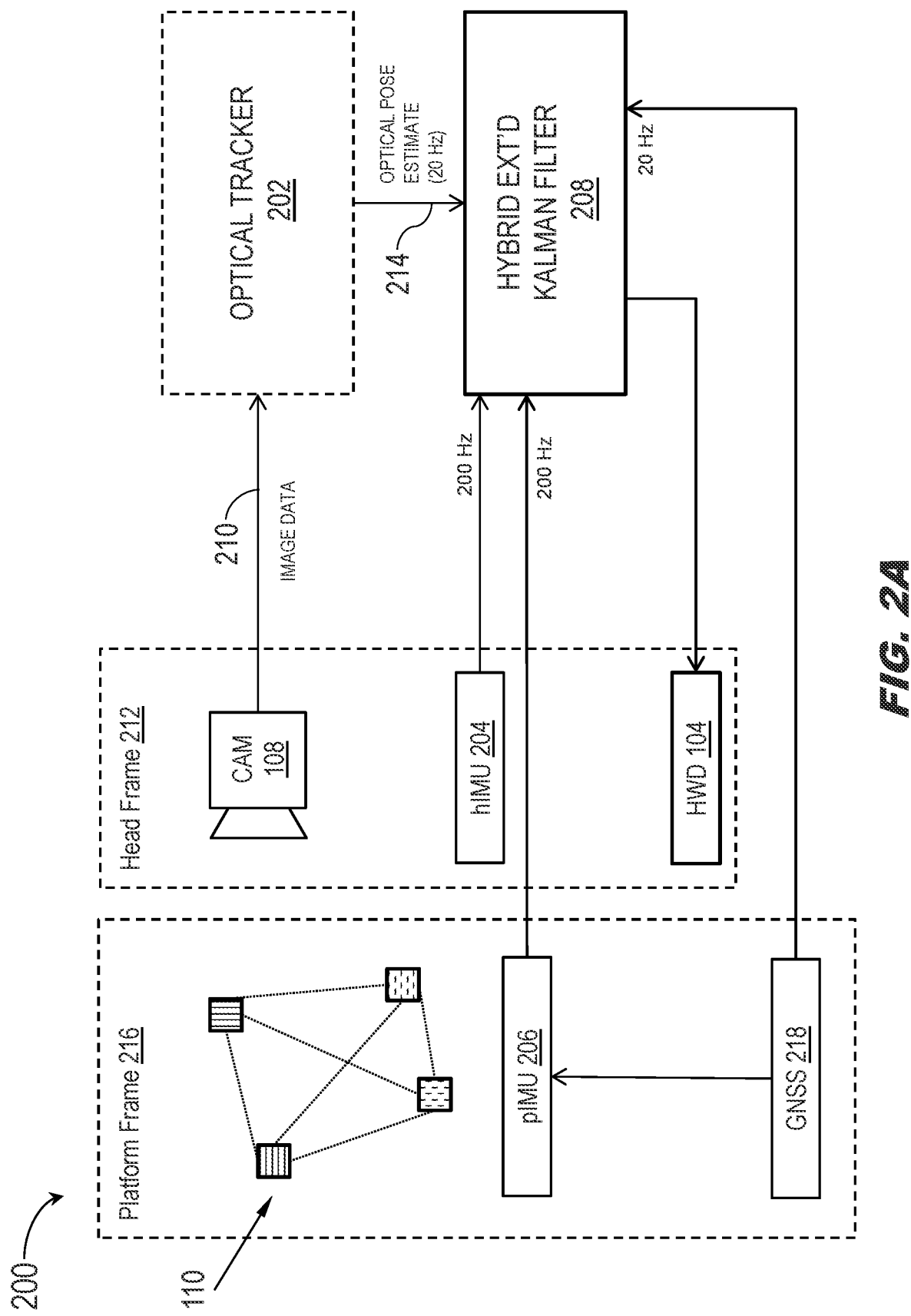
FIG. 2A is a diagrammatic illustration of the head tracking system incorporating a hybrid extended Kalman filter (EKF) of FIG. 1.

Referring now to FIG. 2A, a head tracking system 200 for an HWD 104 is shown. The head tracking system 200 may include, in addition to the camera 108 and fiducial markers 110: optical tracker 202, head-frame IMU 204 (hIMU), platform-frame IMU 206 (pIMU), and hybrid extended Kalman filter 208 (EKF).

In embodiments, the head-tracking system 200 may be configured in an inside-out configuration. For example, the camera 108 and hIMU 204 may be attached to a helmet (106, FIG. 1) worn by the user (102, FIG. 1), such that image data 210 captured by the camera 108 and position and orientation (pose) data measured by the hIMU 204 may be in a head-centered reference frame 212 (e.g., head frame). In embodiments, image data 210 may be analyzed by the optical tracker 202 to identify image regions corresponding to the fiducial markers 110 and, by comparing the relative locations of the image regions to the known location of each fiducial marker, estimate the optical pose of the camera with respect to the three-dimensional (3D) constellation reference frame in which the known locations and orientations of each fiducial marker are defined (e.g., the platform frame, as the locations and orientations of each fiducial marker in an inside-out configuration are fixed with respect to the aircraft (100, FIG. 1)). For example, the optical tracker 202 may determine an initial (e.g., coarse) pose estimate based on an initial match of image regions associated with detected fiducial markers 110 with the 3D position and orientation data for each marker. In embodiments, the optical tracker 202 may refine the initial pose estimate using a variety of techniques and/or algorithms, resulting in a refined (e.g., fine) head pose estimate 214. For example, the refined head pose estimate 214 may include an error model (e.g., an $H_1$ protection level, or the probability of a single hypothetical fault with respect to a pose measurement, and/or pose covariance).

In embodiments, the hIMU 204 may provide high-rate head-frame pose data to the hybrid EKF 208. For example, at no less than a minimum rate (e.g., 200 Hz) the hIMU 204 may provide a measured 3D angular rate and 3D translational acceleration in the head frame (e.g., in addition to a precise timestamp for each measurement).

In embodiments, the pIMU 206 and fiducial markers 110 may be oriented (e.g., in an inside-out configuration) in the platform-centered reference frame 216 (e.g., platform frame, body frame). For example, the fiducial markers 110 may each be fixed in a position and orientation relative to the platform frame 216 (e.g., a 3D constellation frame). In embodiments, the pIMU may provide high-rate platform-frame pose data at a minimum rate similar to the hIMU 204 (e.g., measured 3D angular rate, measured 3D translational acceleration, timestamp at 200 Hz minimum). In some embodiments, the fiducial markers 110 may include, in additional to high-density encoded fiducials, medium-density and/or low-density fiducials as described in commonly owned U.S. patent application Ser. No. 17/895,853 titled HIGH-CONFIDENCE OPTICAL HEAD POSE CORRESPONDENCE MAPPING WITH MULTIPLE LOWER-DENSITY MARKERS FOR HIGH-INTEGRITY HEAD-TRACKING ON A HEADWORN DISPLAY (HWD), which application is herein incorporated by reference in its entirety.

In embodiments, the pIMU 206 may additionally provide low-rate high-integrity pose data. For example, the pIMU 206 may include a georeferenced (e.g., World Geodetic System 1984 (WGS84) or any appropriate ECEF) attitude and heading reference system (AHRS) in communication with a GNSS-driven absolute position receiver 218. In embodiments, at a lower rate (e.g., 20 Hz) than the high-rate pose data produced by the hIMU 204 and pIMU 206, the pIMU may provide timestamped low-rate 3D georeferenced position data (e.g., lat/long/alt in WGS84 coordinates; X, Y, Z in a like ECEF coordinate frame) and georeferenced 3D orientation data (e.g., roll, pitch, heading). In embodiments, the low-rate high integrity georeferenced pose data and corresponding low-rate head pose estimates 214 provided by the optical tracker may be the basis of a low-rate high integrity head pose solution sufficiently accurate for presentation to and use by high integrity applications running on the HWD 104. For example, the low-rate high integrity solution may be updated by the hybrid EKF 208 based on the high-rate head-frame and platform-frame pose data provided by the hIMU 204 and pIMU 206.

In embodiments, the combined error state vector $$x=[x_a x_b]$$

determined by the hybrid EKF 208 may combine the extended Kalman filter for relative navigation (e.g., between head and platform frames) with a transfer alignment navigational filter capable of augmenting the relative navigation filter with high-rate, bias-corrected, aircraft/platform angular rates and translational accelerations. For example, error dynamics for platform relative navigation and platform absolute navigation may share common aircraft inertial sensor biases, as indicated by the component error state vectors $x_a$ (corresponding to the relative navigation filter) and $x_b$ corresponding to the absolute navigation filter:

$$x_a=[\delta r_{h/b}{}^b \delta v_{h/b}{}^b \delta a_{b,h} \varphi^b \delta \omega_{b,h} \delta b \delta a_{b,b} \delta \omega_{b,b}]$$

$$x_b=[\delta \theta \delta h \delta v_n{}^i \psi \delta a_{b,b} \delta \omega_{b,b}]$$

Referring now to FIGS. 2B and 2C, the equation ẋ may specify the continuous time stochastic differential equation relevant to propagation of the elements in the error estimate x. With respect to the error state dynamics matrix J, the portion 220 may correspond to the error state dynamics for relative navigation filtering, while the portion 222 may correspond to error state dynamics for platform absolute navigation filtering (the portion 224 may correspond to the shared error states $\delta a_{b,b}$, and $\delta \omega_{b,b}$ common to both sets of error dynamics).

Figure 3A:
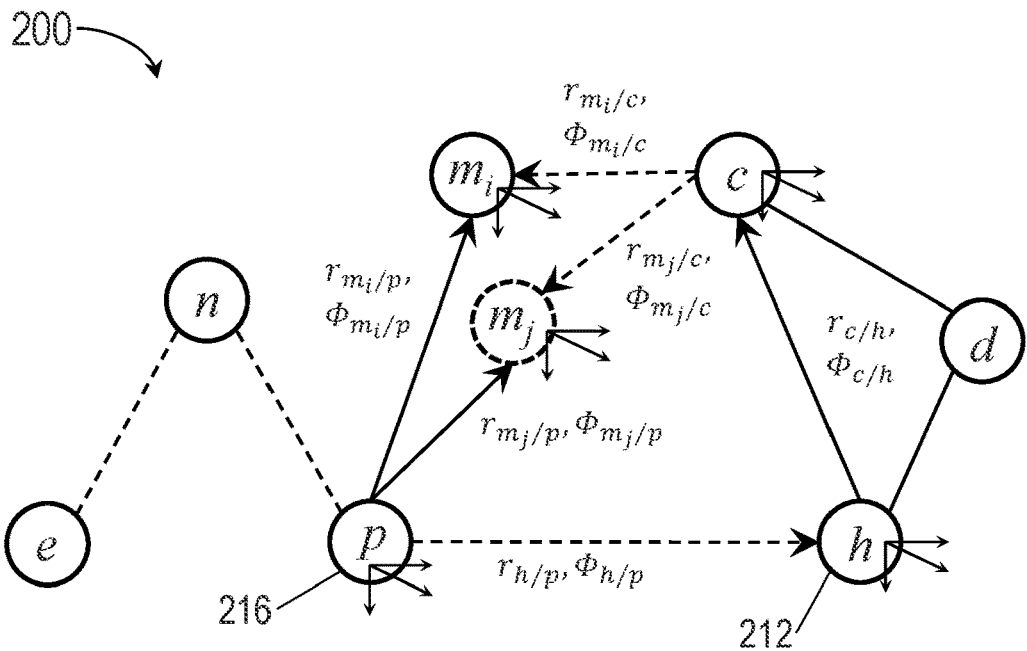
FIGS. 3A and 3B are diagrammatic illustrations of coordinate reference frames relative to, respectively, the inside-out head tracker system of FIG. 1 and the outside-in head tracker system shown by, e.g., FIG. 5.

Referring now to FIG. 3A, the head tracking system 200 is shown in the inside-out configuration.

In embodiments, the coordinate reference frames relevant to the head tracking system may relate to each other via either fixed, constant transformations (e.g., solid lines) or time-varying transformations (e.g., dotted lines). For example, where the camera (108, FIG. 2A) is fixed to the head of the user (102, FIG. 1) (e.g., strapdown configuration), the camera reference frame c and the head frame h (212) may be related by a fixed transformation $r_{c/h}, \Phi_{c/h}$ to reflect the fixed position $r_{c/h}$ and orientation $\phi_{c/h}$ of the camera 108 relative to the head of the user 102. Similarly, the marker reference frames $m_i, m_j \ldots m_n$ for each of N fiducial markers 110 may relate to the platform frame p (216; alternatively, body frame b) by fixed transformations $r_{m_i/p}$, $\Phi_{m_i/p}, r_{m_j/p}, \Phi_{m_j/p} \ldots r_{m_n/p}, \Phi_{m_n/p}$ as the fiducial markers do not move with respect to the aircraft (100, FIG. 1). However, the transformations $r_{h/p}, \Phi_{h/p}$ relating the head frame h (212) to the platform frame p (216), as well as the transformations $r_{m_i/c}, \Phi_{m_i/c}, r_{m_j/c}, \Phi_{m_j/c} \ldots r_{m_{n/hd\ c}}, \Phi_{m_n/c}$ relating each marker reference frame $m_i, m_j \ldots m_n$ to the camera reference frame c may be time-varying to reflect the movement of the head relative to the aircraft 100, and of the camera 108 relative to the fiducial markers 110.

Figure 3B:
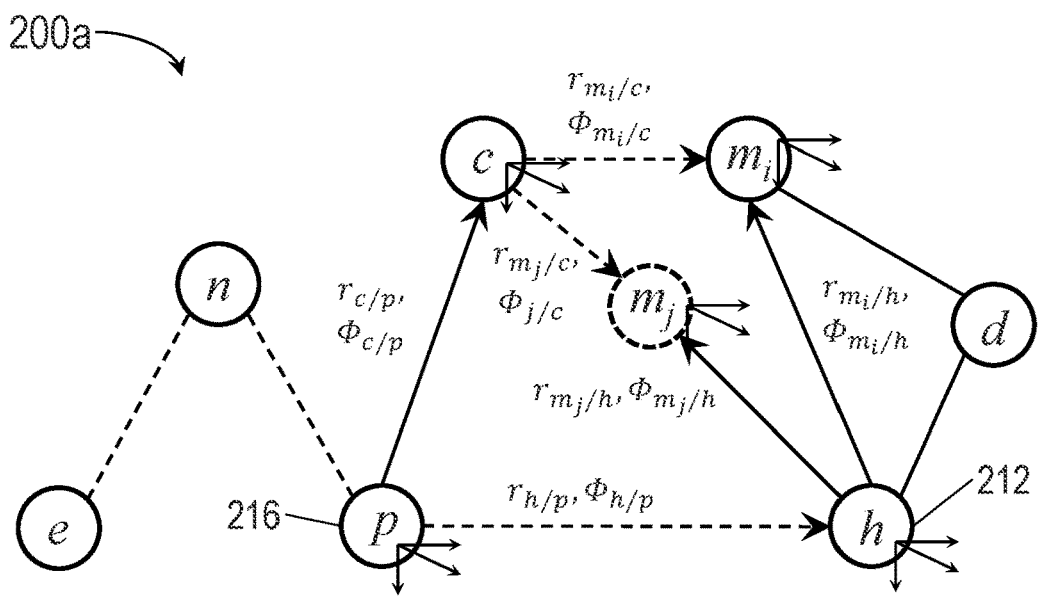
Figure 5:
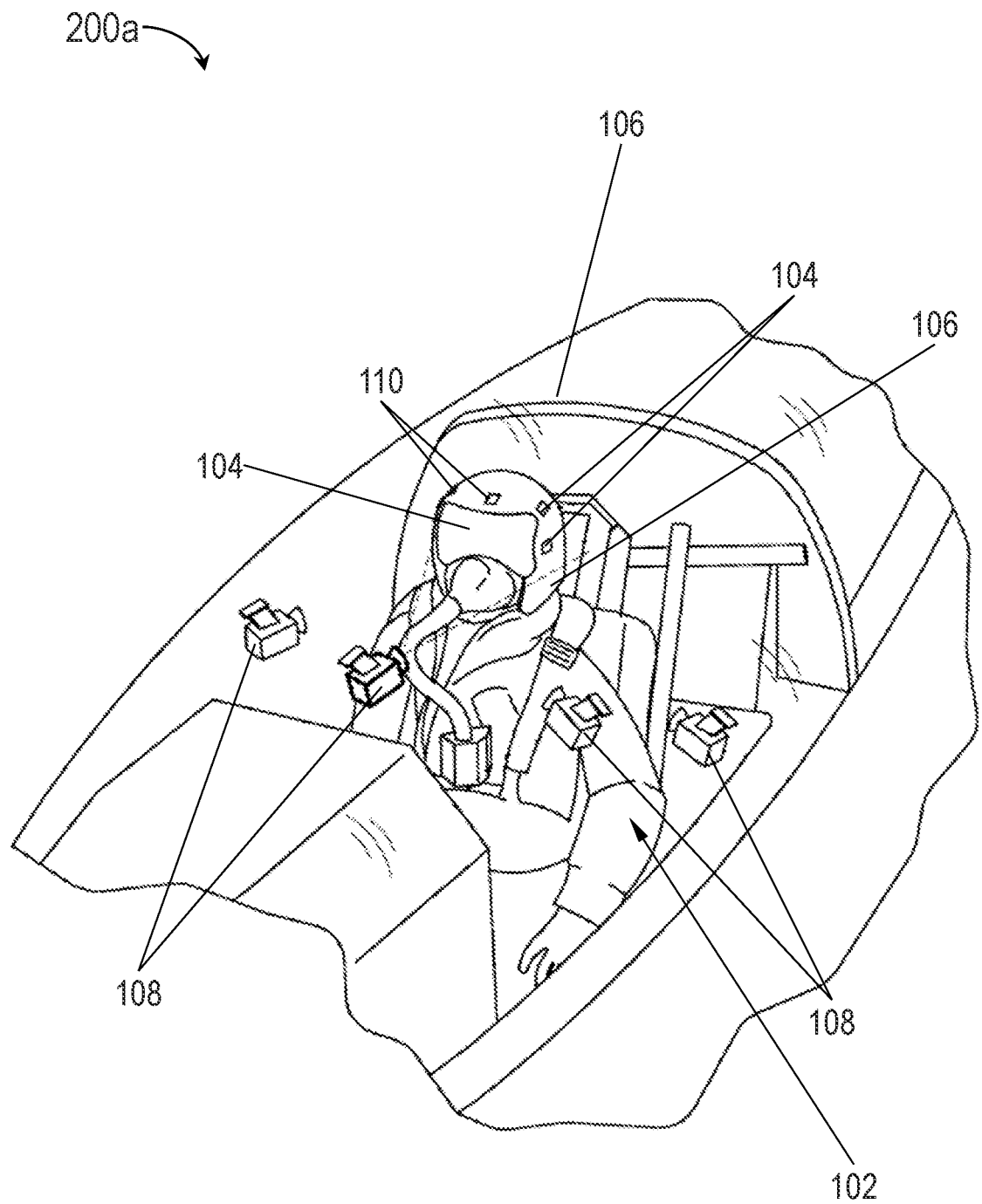
FIG. 5 is an illustration of the aircraft cockpit environment and HWD of FIG. 1, wherein the head tracking system is in an outside-in configuration.

Referring now to FIG. 3B, in embodiments the head tracking system 200a may be implemented and may function similarly to the head tracking system 200 of FIGS. 2 and 3A, except that the head tracking system 200a may be implemented in an outside-in configuration (as also shown by FIG. 5 below) wherein the cameras (108, FIGS. 1-2) may be fixed to the cockpit environment and the fiducial markers (110, FIGS. 1-2) may be fixed to the head of the user (102, FIG. 1). Accordingly, when in the outside-in configuration the camera reference frame c and the platform frame p (216) may be related by a fixed transformation $r_{c/p}, \Phi_{c/p}$ to reflect position offset $r_{c/p}$ and orientation offset $\phi_{c/p}$ of the camera 108 relative to the aircraft (100, FIG. 1). Similarly, the marker reference frames $m_i, m_j \ldots m_n$ for each of the N fiducial markers 110 may relate to the head frame h (212) by a set of time-varying transformations $r_{m_i/h}, \phi_{m_i/h}, r_{m_j/h}, \Phi_{m_j/h} \ldots r_{m_n/h}, \phi_{m_n/h}$ as the fiducial markers are fixed to the head of the user 102. Similarly to the head tracking system 200, the transformations $r_{h/p}, \Phi_{h/p}$ relating the head frame h (212) to the platform frame p (216) may be time-varying to reflect the movement of the head relative to the aircraft 100.

Figure 4:
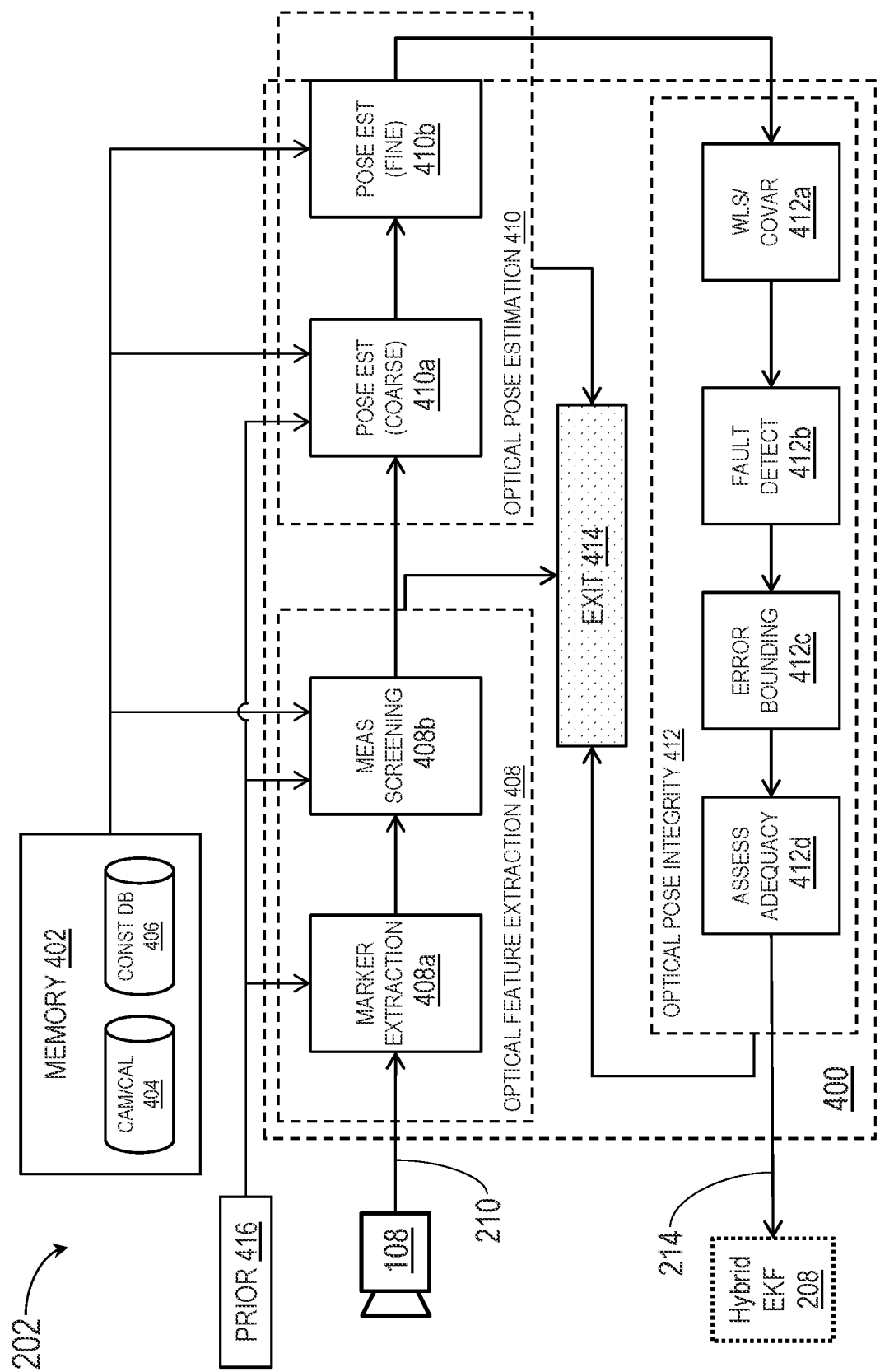
FIG. 4 is a diagrammatic illustration of an optical tracker of the head tracking system of FIG. 2A.

Referring to FIG. 4, the optical tracker 202 is shown. The optical tracker 202 may include control processors 400 and memory/data storage 402.

In embodiments, data storage 402 may include camera calibration data 404 and constellation data 406. For example, camera calibration data for the camera/s 108 may include (e.g., in the camera reference frame c) parameters for camera focal length $\alpha_x, \alpha_y$ (e.g., measured in horizontal/vertical pixel width), the camera principal point $x_o, y_o$, and the camera skew parameter s (e.g., also measured in pixels).

In embodiments, during intrinsic calibration of the camera 108, a linear camera calibration matrix K may be developed, where $$K = \begin{bmatrix} \alpha_x & s & x_o \\ 0 & \alpha_y & y_o \\ 0 & 0 & 1 \end{bmatrix}.$$

Additional calibration of the camera 108 may correct for radial and/or tangential distortion. In embodiments, a perspective projection based on the camera calibration matrix K may be defined:

$$\begin{bmatrix} v_x \\ v_y \\ v_z \end{bmatrix} = \begin{bmatrix} \alpha_x & s & x_o \\ 0 & \alpha_y & y_o \\ 0 & 0 & 1 \end{bmatrix} \begin{bmatrix} x_{cv} \\ y_{cv} \\ z_{cv} \end{bmatrix}, \text{ where } y = K x_{m/c}^{cv} \text{ and } p = \begin{bmatrix} y(1)/y(3) \\ y(2)/y(3) \end{bmatrix}$$

where $x_{m/c}^{cv}$ is a 3D location of a fiducial marker (110, FIGS. 1-2) with respect to the camera 108 (e.g., in computer vision (cv) coordinates) and p is the corresponding pixel location of the fiducial marker. For example, cv coordinates may be consistent with computer vision conventions and may be centered at a focal point (e.g., with z along the optical axis, x to the right, y down). In some embodiments, nonlinear mappings may be applied to nonlinear cameras.

In embodiments, the stored constellation data 406 may define each fiducial marker 110 according to a unique marker identifier (e.g., a unique integer encoded into a QR code or other like identifying pattern). Further, marker data may include image corners of each fiducial marker (e.g., in the 3D marker reference frame m, $m_n$) and finder pattern centers for pose estimation (e.g., also in the appropriate marker frame, for minimizing reprojection error between 3D positions of the finder patterns and the detected location of the finder patterns in the image data 210. In some embodiments, constellation data 406 may include a structure array defining marker geometry (e.g., of each fiducial marker 110 relative to each other fiducial marker).

In embodiments, the control processors 400 of the optical tracker 202 may include processes and/or process flows for optical feature extraction 408, optical pose estimation 410, and optical pose integrity modeling 412.

In embodiments, optical feature extraction 408 receives image data 210 captured by the cameras 108 and identifies (408a) within the image data image regions including candidate fiducial markers. For example, candidate fiducial markers may be decoded to determine the corresponding marker identifiers, and the marker identifiers checked against the constellation data 406. Measurement screening (408b) may match detected fiducial markers 110 to their equivalents in the constellation data 406, and discard any decoded marker identifiers not matching a marker identifier in the constellation data. In embodiments, optical feature extraction 408 may output a set of measured pixel locations of fiducial markers 110 (e.g., in the 2D camera frame c) and the corresponding locations of each identified fiducial marker in the 3D constellation frame (e.g., marker frame m). In some embodiments, optical feature extraction 408 may exit (414) or terminate early if, for example, not enough fiducial markers 110 are detected, or if the detected fiducial markers do not match the corresponding marker geometry in the constellation data 406.

In embodiments, optical pose estimation 410 may receive the array of measured marker locations and corresponding 3D constellation data and perform an initial estimate (410a; coarse estimate) of the head pose of the user 102 in the 3D constellation frame. For example, the initial head pose estimate 410a may be based on a direct linear transformation (DLT), e.g., a unique least-squares solution for 3D perspective matrix P of the camera 108, which transforms homogenous points in 3D space to points in a 2D plane. Further, the initial head pose estimate 410a may include error modeling of uncertainties with respect to the position and orientation of the camera 108. In some embodiments, the initial pose estimate 410a may be based on a coasted prior head pose estimate 416, e.g., from a prior time of validity and propagated forward to the current time of validity. For example, the initial pose estimate 410a may be a tightly coupled update wherein a prior head pose estimate 416 is refined by the detection of fiducial markers 110 from the image data 210 at the current time of validity, even though the fiducial markers detected may not independently support a snapshot head pose estimate based solely on the detection of fiducial markers within a set of image data. In some embodiments, the initial pose estimate 410a may be a loosely coupled update incorporating a coasted prior head pose estimate 416 and pose covariance, e.g., determined as disclosed in commonly owned U.S. Pat. No. 10,909,715, which is herein incorporated by reference in its entirety. In embodiments, error bounds associated with tightly coupled or loosely coupled pose updates may account for the effect on the time difference between the prior and current times of validity on the accuracy and/or integrity of the pose estimate.

In embodiments, given an initial pose estimate 410a, a refined (e.g., fine, more accurate) pose estimate 410b may be determined. For example, nonlinear optimization may be employed to minimize reprojection errors. In some embodiments, either the initial or refined pose estimates 410a-410b may fail or exit (414) if reasonableness checks or fine/coarse convergence checks are not met.

In embodiments, optical pose integrity 412 may include: construction (412a) of a measurement model (e.g., fault-free $H_0$), weighted least squares (WLS) head pose solution and measurement covariance R, dilution of precision (DOP) metrics for the head tracking system 200 (e.g., to determine whether the marker geometry is adequate for pose estimation), and assessment of solution observability in the presence of noise (e.g., considering singular value decomposition (SVD) of the measurement matrix). In some embodiments, fault detection (412b) may determine measurement residuals based on the WLS solution to determine whether head pose measurements are consistent with the fault-free $H_0$ measurement model. In some embodiments, error bounding (412c) may determine whether the refined head pose estimate 410b is accurate enough for use by the HWD (104, FIG. 1) and set protection levels, e.g., $H_0$, $H_1$ (single-point fault), $H_{2+}$. Finally, in embodiments optical pose integrity 412 may assess (412d) the adequacy of the refined optical pose estimate 410b based on, e.g., comparing protection levels to alert levels associated with a particular high-integrity application. For example, the refined optical pose estimate 410b may fail (414) at any point if the pose solution is rank deficient, if faults are detected, if accuracy checks fail, etc.

In embodiments, the optical head pose estimate 214 based on the refined optical pose estimate 410b and send to the hybrid EKF 208 may additionally include the corresponding time of validity and pose covariance as well as accuracy and integrity bounds. For example, a head pose covariance may be determined as disclosed in commonly owned U.S. Pat. No. 10,909,715, which is herein incorporated by reference in its entirety.

Referring now to FIG. 5, the head tracking system 200a referenced by FIG. 3B is shown in the outside-in configuration.

In embodiments, the head tracking system 200a may include one or more cameras 108 rigidly attached to the aircraft 100 (e.g., in fixed positions and/or orientations relative to the cockpit environment) and fiducial markers 110 rigidly attached to the helmet 106 or otherwise attached to the head of the user 102 (e.g., the wearer of the HWD 104). For example, relative position measurements may be made in the camera frame c, and perturbations in the marker frame m and camera frame c may differ from those in the inside-out configuration (shown by, e.g., FIGS. 1 and 2).

Figure 6:
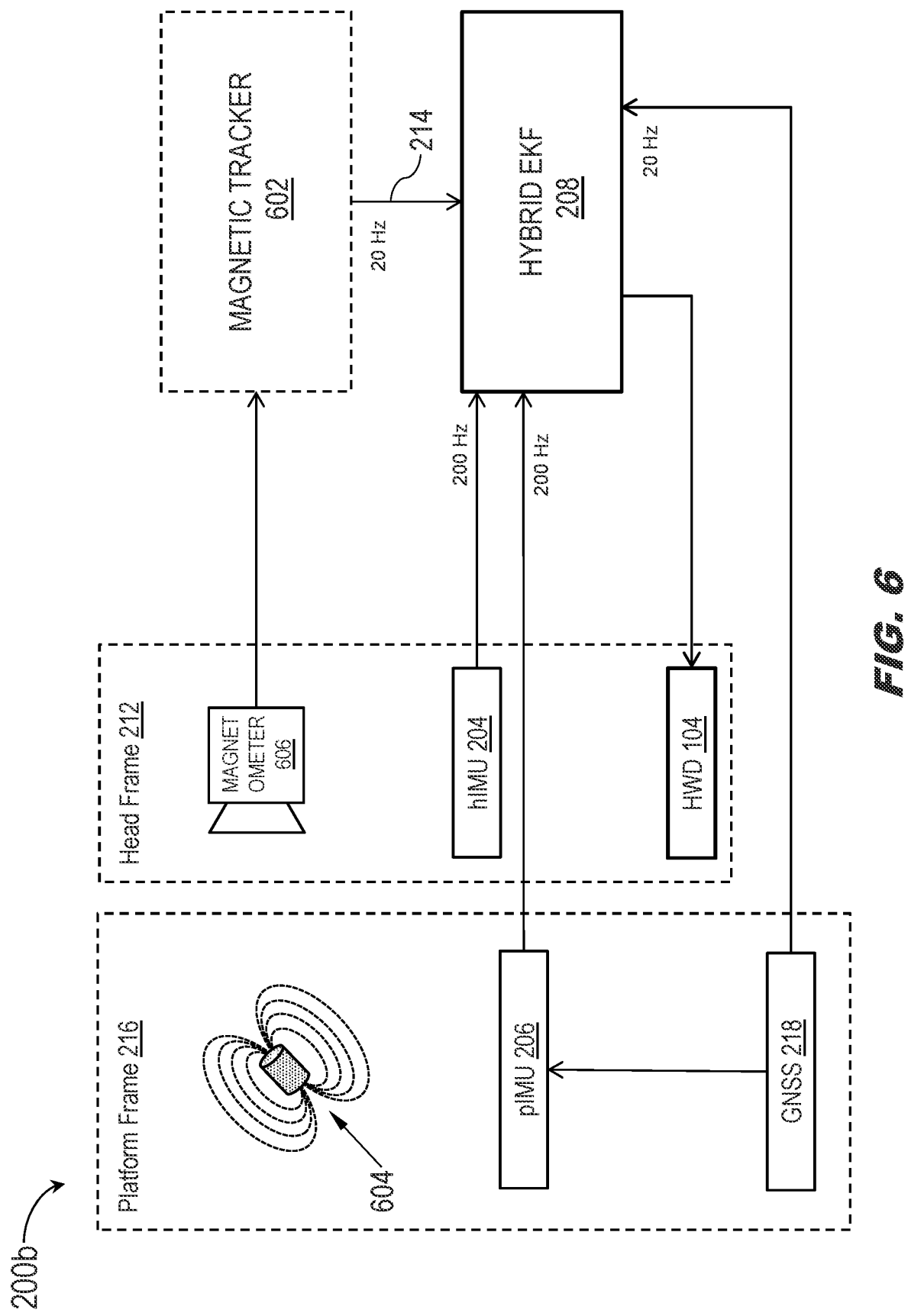
FIG. 6 is a diagrammatic illustration of the head tracking system of FIG. 4 where optically based tracking is replaced by magnetically based tracking.

Referring now to FIG. 6, the head tracking system 200b may be implemented and may function similarly to the head tracking system 200 of FIG. 2A, except that the head tracking system 200b may replace the optical tracker (202, FIG. 2A) with a magnetic tracker 602.

In embodiments, the head tracking system 200b may incorporate, instead of the camera (108, FIG. 1) and fiducial markers (110, FIG. 1), a well characterized magnetic source 604 (e.g., oriented in the platform frame p or consistently and measurably offset therefrom) configured to generate a well-known magnetic field measurable by a magnetometer 606 or other like magnetic sensor. For example, the magnetic tracker 602 may, based on measurements of the magnetic source 604 by the magnetometer 606, update the low-rate high-integrity head pose solution via low-rate head pose estimates (214; FIGS. 2 and 4).

Figure 7A:
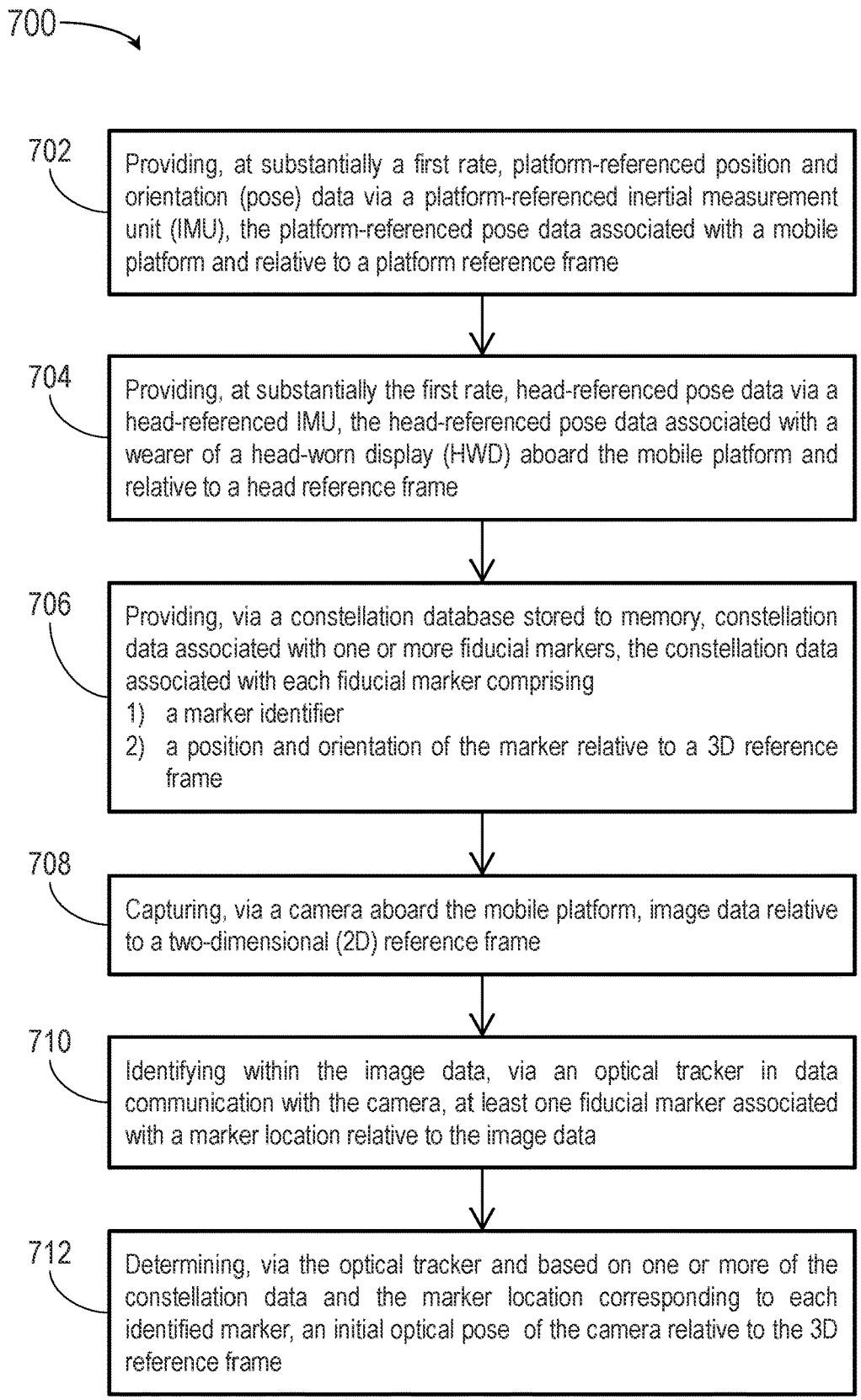

Referring now to FIG. 7A, the method 700 may be implemented by the head tracking systems 200, 200a, 200b and may include the following steps.

At a step 702, the pIMU provides high-rate (e.g., 200 Hz) pose data of an aircraft or other mobile platform (e.g., a relative position and orientation of the aircraft), in the platform-referenced reference frame (platform frame).

At a step 704, the hIMU provides high-rate head pose data (e.g., a relative position and orientation of the head of the user/wearer of a head worn display (HWD)) in the head-referenced reference frame (head frame).

At a step 706, a constellation database stored to memory (e.g., of an optical tracker of the head tracking system) provides constellation data identifying and positioning each of a set of fiducial markers in a three-dimensional (3D) constellation-referenced reference frame (e.g., marker frame).

At a step 708, a camera aboard the mobile platform captures image data in a two-dimensional (2D) camera reference frame, the image data portraying the aircraft environment wherein the fiducial markers are positioned (e.g., a cockpit within which the HWD user is seated). In some embodiments, e.g., in an outside-in configuration, the camera is mounted to the mobile platform and captures images of the user's head and fiducial markers attached thereto. In some embodiments, the optical tracker is a magnetic tracker wherein a magnetometer measures a magnetic field generated by a well-known magnetic source.

At a step 710, the optical tracker identifies one or more fiducial markers at image locations (e.g., image regions) within the image data.

At a step 712, the optical tracker determines, based on the image locations and corresponding constellation data for each identified marker, an initial optical pose of the camera relative to the 3D constellation frame.

Figure 7B:
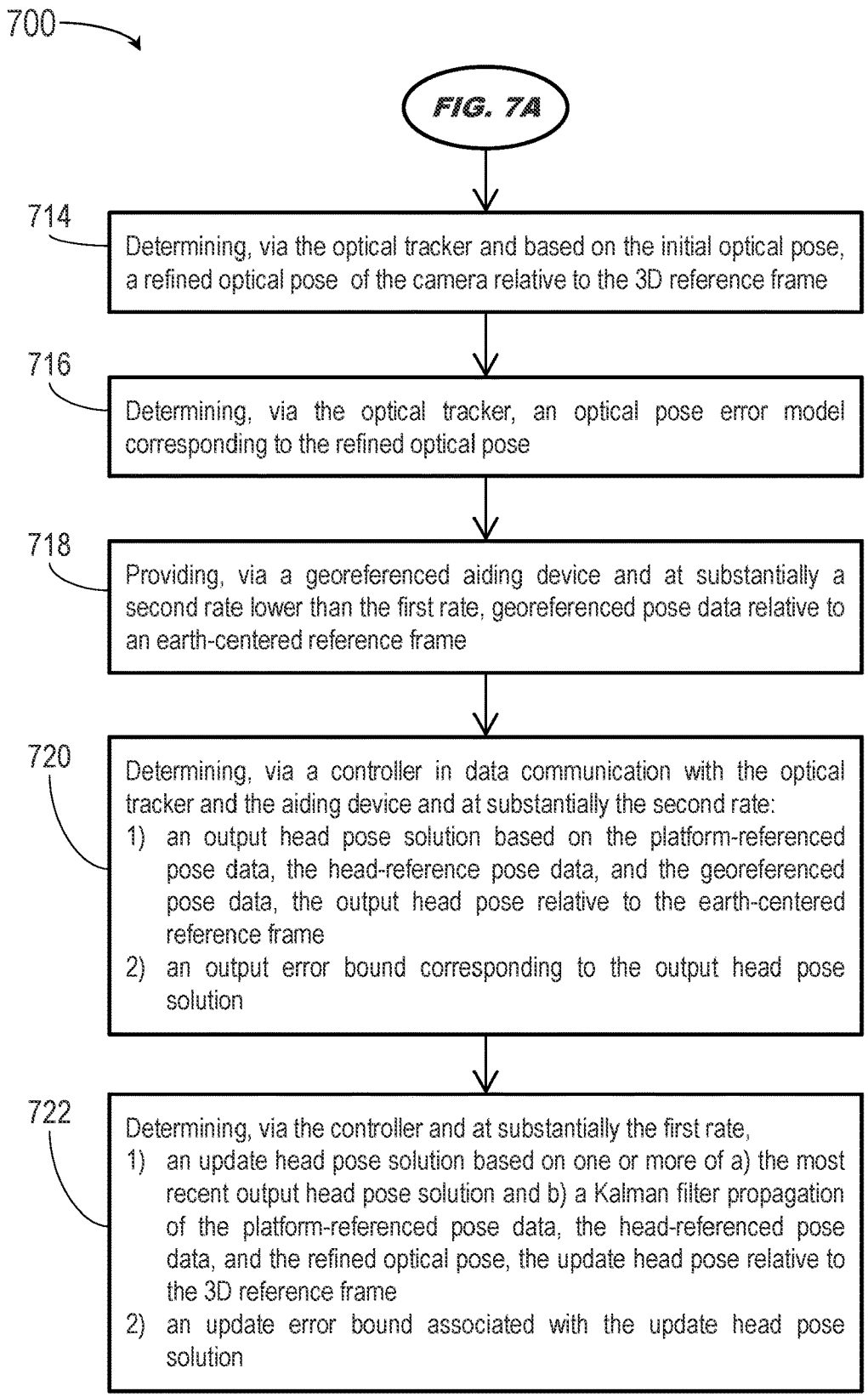

Referring also to FIG. 7B, at a step 714, the optical tracker determines a refined optical pose based on the initial optical pose.

At a step 716, the optical tracker determines an error model for the refined optical pose.

At a step 718, a georeferenced aiding device (e.g., WGS 84 or GNSS assisted attitude and heading reference system (AHRS)) provides, at a lower rate than the high-rate pose data (e.g., 20 Hz), georeferenced pose data (e.g., platform pose data) in an earth-centered earth-fixed (ECEF) reference frame (earth frame).

At a step 720, the head tracking system determines a low-rate high-integrity head pose solution (e.g., a head pose of the user in the earth frame) based on hybrid extended Kalman filter propagation of the low-rate georeferenced pose data and the high-rate platform-frame and head-frame pose data. Further, the head tracking system determines an error model (e.g., integrity bounds) for the low-rate head pose solution.

At a step 722, the head tracking system updates the low-rate high-integrity head pose solution (e.g., between determinations of low-rate pose data) with a high-rate updated head pose based on the most recent low-rate head pose solution and extended Kalman filter propagation of the refined optical pose determined by the optical tracker, along with the high-rate head-frame and platform-frame pose data. Further, the head tracking system likewise determines an error model for the high-rate head pose solution update.

Referring also to FIG. 7C, the method 700 may include an additional step 724. At the step 724, the head tracking system forwards the low-rate or high-rate head pose solution and corresponding error model to the HWD for use in symbol display (e.g., depending on the integrity bounds of the solution).

Referring also to FIG. 7D, the method 700 may include an additional step 726. At the step 726, the optical tracker determines the initial optical pose for a given time of validity based on a high-integrity head pose solution determined by the head tracking system at a prior time of validity.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A head tracking system for a head worn display (HWD), comprising:
at least one platform inertial measurement unit (pIMU) configured to be fixed to a mobile platform, the mobile platform associated with a platform reference frame, the at least one pIMU configured to provide, at substantially a first rate, platform-referenced position and orientation (pose) data corresponding to the mobile platform and relative to the platform reference frame;
at least one head inertial measurement unit (hIMU) configured to be fixed to a head of a wearer of the HWD, the at least one hIMU configured to provide, at substantially the first rate, head-referenced pose data corresponding to the head and relative to a head reference frame;
an optical tracker configured to be mounted to one of the mobile platform or the head, the optical tracker comprising:
at least one data storage element configured for storage of:
processor-executable encoded instructions;
and
constellation data associated with one or more fiducial markers, the constellation data associated with each fiducial marker comprising:
a unique encoded identifier;
and
location data associated with a position and orientation of the fiducial marker relative to a three-dimensional (3D) reference frame;
at least one camera configured to capture image data relative to a two-dimensional (2D) reference frame;
at least one processor operatively coupled to the camera, the processor configurable by the processor-executable encoded instructions to:
identify, at least one fiducial marker associated with a marker location relative to the image data;
and
based on one or more of the location data and the marker location corresponding to each identified fiducial marker, determine:
an initial optical pose of the camera relative to the 3D reference frame;
a refined optical pose of the camera relative to the 3D reference frame and based on the initial optical pose;
and
an optical pose error model corresponding to the refined optical pose;
at least one georeferenced aiding device configured to provide, at a second rate lower than the first rate, georeferenced pose data relative to an earth-centered reference frame;
and
at least one controller in data communication with the at least one pIMU, the at least one hIMU, the aiding device, and the optical tracker, the controller including at least one processor configured to:
determine, at substantially the second rate:
1) An output head pose solution based on the platform-referenced pose data, the head-reference pose data, and the georeferenced pose data, the output head pose relative to the earth-centered reference frame;

and 2) an output error bound corresponding to the output head pose solution;

and determine, at substantially the first rate:

1) An update head pose solution based on one or more of a) the most recent output head pose solution and b) a Kalman filter propagation of the platform-referenced pose data, the head-referenced pose data, and the refined optical pose, the update head pose relative to the 3D reference frame;

and 2) an update error bound associated with the update head pose solution.

2. The head tracking system of claim 1, wherein the controller is configured to forward to a display unit of the HWD one or more of:

the output head pose solution and the output error bound; or the update head pose solution and the update error bound.

3. The head tracking system of claim 1, wherein the update head pose solution includes a tightly coupled update based on an output head pose solution associated with a prior time of validity.

4. The head tracking system of claim 1, wherein the update head pose solution includes a loosely coupled update based on an output head pose solution associated with a prior time of validity.

5. The head tracking system of claim 1, wherein an initial optical pose corresponding to a current time of validity is based on a refined optical pose corresponding to a prior time of validity.

6. The head tracking system of claim 1, wherein the optical tracker is at least one of attached to the HWD or associated with the head reference frame.

7. The head tracking system of claim 1, wherein the optical tracker is at least one of attached to the mobile platform or associated with the platform reference frame.

8. The head tracking system of claim 1, wherein the optical tracker is configured to determine the optical pose error model by:

produce at least one reprojection of the image data based on the initial optical pose;

determine an optical pose covariance based on the initial optical pose, the one or more identified markers, and the associated image data;

compare the reprojected image data to the associated image data;

determine a pose estimation fault status;

and determine a protection level corresponding to the optical pose error model based on the optical pose covariance and the pose estimation fault status.

9. The head tracking system of claim 1, wherein:

the constellation data is associated with one or more fiducial constellations, each fiducial constellation comprising:

a plurality of fiducial markers;

and marker geometry pose data corresponding to the plurality of markers, the marker geometry pose data including a position and orientation of each fiducial marker of a fiducial constellation relative to each other marker of the fiducial constellation;

and the at least one processor is configured to:

based on one or more of the marker identifiers, the marker location data, or the marker geometry pose data, identify at least one fiducial constellation within the image data;

and determine the initial optical pose based on the marker location data and the marker geometry pose data associated with the identified fiducial constellation.

10. A method for determining an absolute head pose, the method comprising:

providing, at substantially a first rate, platform-referenced position and orientation (pose) data via a platform-referenced inertial measurement unit (pIMU) fixed to a mobile platform, the platform-referenced pose data associated with the mobile platform and relative to a platform reference frame;

providing, at substantially the first rate, head-referenced pose data via a head-referenced inertial measurement unit (hIMU) fixed to a head of a wearer of a head-worn display (HWD) aboard the mobile platform, the head-referenced pose data associated with the wearer and relative to a head reference frame;

providing, via a constellation database stored to memory, constellation data associated with one or more fiducial markers, the constellation data associated with each marker comprising 1) a marker identifier and 2) a position and orientation of the fiducial marker relative to a three-dimensional (3D) reference frame;

capturing, via a camera aboard the mobile platform, image data relative to a two-dimensional (2D) reference frame;

identifying within the image data, via an optical tracker in data communication with the camera, at least one fiducial marker associated with a marker location relative to the image data;

determining, via the optical tracker and based on one or more of the constellation data and the marker location corresponding to each identified fiducial marker, an initial optical pose of the camera relative to the 3D reference frame;

determining, via the optical tracker and based on the initial optical pose, a refined optical pose of the camera relative to the 3D reference frame;

determining, via the optical tracker, an optical pose error model corresponding to the refined optical pose;

providing, via a georeferenced aiding device and at substantially a second rate lower than the first rate, georeferenced pose data relative to an earth-centered reference frame;

determining, via a controller in data communication with the optical tracker and the aiding device and at substantially the second rate:

1) An output head pose solution based on the platform-referenced pose data, the head-reference pose data, and the georeferenced pose data, the output head pose solution relative to the earth-centered reference frame;

and 2) an output error bound corresponding to the output head pose solution;

and determining, via the controller and at substantially the first rate,

1) An update head pose solution based on one or more of a) the most recent output head pose solution and b) a Kalman filter propagation of the platform-referenced pose data, the head-referenced pose data, and the refined optical pose, the update head pose solution relative to the 3D reference frame;
and
2) an update error bound associated with the update head pose solution.

11. The method of claim 10, further comprising:
forwarding to a display unit of the HWD, via the controller, one or more of:
the output head pose solution and the output error bound;
or
the update head pose solution and the update error bound.

12. The method of claim 10, wherein determining, via the optical tracker and based on one or more of the constellation data and the marker location corresponding to each identified marker, an initial optical pose of the camera relative to the 3D reference frame includes:
determining an initial optical pose associated with a current time of validity based on a refined optical pose associated with a prior time of validity.

13. The method of claim 10, wherein the optical tracker is at least one of attached to the HWD or associated with the head reference frame.

14. The method of claim 10, wherein the optical tracker is at least one of attached to the mobile platform or associated with the platform reference frame.

15. The method of claim 10, wherein determining, via the optical tracker, an optical pose error model corresponding to the refined optical pose includes:
producing, via the optical tracker, at least one reprojection of the image data based on the initial optical pose;
determining, via the optical tracker, an optical pose covariance based on the initial optical pose, the one or more identified markers, and the associated image data;
comparing, via the optical tracker, the reprojected image data to the associated image data;
determining, via the optical tracker and based on the comparing, a pose estimation fault status;
and
determining, via the optical tracker, a protection level corresponding to the optical pose error model based on the optical pose covariance and the pose estimation fault status.

16. The method of claim 10, wherein the constellation data is associated with one or more fiducial constellations, each fiducial constellation comprising:
a plurality of markers;
and
marker geometry pose data corresponding to the plurality of markers, the marker geometry pose data including a position and orientation of each marker of a fiducial constellation relative to each other marker of the fiducial constellation;
and wherein:
identifying within the image data at least one marker associated with a marker location relative to the image data includes:
identifying at least one fiducial constellation within the image data;
and
determining an initial optical pose of the camera relative to the 3D reference frame includes:
determining an initial optical pose based on the marker location data and the marker geometry pose data associated with the identified fiducial constellation.

* * * * *